United States Patent [19]

Hawley

[11] 4,407,663
[45] Oct. 4, 1983

[54] MODULAR SPIN FILTERS AND HOUSING THEREFOR

[75] Inventor: Clyde W. Hawley, Fairport, N.Y.

[73] Assignee: Dollinger Corporation, Rochester, N.Y.

[21] Appl. No.: 393,749

[22] Filed: Jun. 30, 1982

[51] Int. Cl.³ .............................................. B01D 45/12
[52] U.S. Cl. .................................. 55/347; 55/348; 55/450; 312/111
[58] Field of Search ................................ 55/346–348, 55/450, 478; 210/512.2; 312/111

[56] References Cited

U.S. PATENT DOCUMENTS

| | | | |
|---|---|---|---|
| 3,046,972 | 7/1962 | Pappas | 312/111 X |
| 3,357,763 | 12/1967 | Toper | 55/478 X |
| 3,360,909 | 1/1968 | Barnerias | 55/348 |
| 3,738,723 | 6/1973 | Rudolph et al. | 312/111 |
| 3,915,679 | 10/1975 | Roach et al. | 55/348 X |
| 3,999,818 | 12/1976 | Schankler | 312/111 |
| 4,023,871 | 5/1977 | Dantzler | 312/111 X |
| 4,348,057 | 9/1982 | Parenti et al. | 55/348 X |

FOREIGN PATENT DOCUMENTS 1255448  1/1961  France ................................ 312/111

Primary Examiner—Kathleen J. Prunner

Attorney, Agent, or Firm—Shlesinger, Fitzsimmons & Shlesinger

[57] ABSTRACT

This filter module comprises a rectangularly shaped housing made from four separate parts—namely, a pair of rectangularly shaped front and rear sections, respectively, and a pair of rectangular end panels or caps releasably fastened to opposite ends of the front and rear sections to hold them in registry with each other. The two end panels have dovetail-shaped tongue and groove connections with confronting surfaces on the front and rear sections of the module, so that the end panels can be shifted in one direction to secure the front and rear sections together, and in another direction to disassemble the front and rear sections. A plurality of gas discharge tubes project from the rear section coaxially into a plurality of filter tubes, which project rearwardly from gas inlet openings in the front section of the module. Conventionally shaped spinner elements are fixed in the forward ends of the filter tubes to cause incoming gas to be swirled coaxially in the filter tubes, whereby dust and moisture in the swirling gases are urged radially outwardly and through annular spaces between each pair of cooperating tubes to a bleeder duct, which connects a dust bin, or the like to one end of the module. The remaining, clean portions of the gases pass directly from the filter tubes into the registering ends of the discharge tubes for discharge out of the back of the module.

10 Claims, 4 Drawing Figures

MODULAR SPIN FILTERS AND HOUSING THEREFOR

BACKGROUND OF THE INVENTION

This invention relates to inertial spin filters or centrifugal separators, and more particularly to an improved modular-type spin filter or separator, which relies upon centrifugal force to separate dirt and moisture in dispersed form from a stream of gas, such as air.

It has long been customary to employ centrifugal separators, known also in industrial filter applications as inertial spin filters, of the type which are placed in a stream of gas to mechanically separate dust particles and the like from the gas during its passage through the filter. Typically such a filter comprises a series of tubes containing stationary air spinners, or convolute cores, which impart a swirling motion and high radial velocity to the gas as it passes through a respective tube. Normally the tubes are placed side-by-side in a rigid housing with their spinner cores mounted adjacent the inlet ends of the tubes, and with discharge tubes or ducts of smaller diameter projecting from the outlet ends of the spin filter tubes, so that an annular space is thus formed between the discharge duct and the bore wall of each spin filter tube. During use, dust particles and moisture in the swirling gas are urged by centrifugal forces radially outwardly as the gas approaches the discharge end of each spin filter tube, whereby the cleaned gas passes directly through the discharge tube, while the dust particles and droplets exit through the annular space around the outside of the discharge tube, and into a bleeder duct which exhausts the particles to atmosphere or to a collector.

Heretofore it has been customary to mold filter housings of the type described from corrosion-resistant plastic materials, such as for example polypropylene and the like. Typically each housing is made in two separate parts, which are thereafter secured together by conventional fastening means, such as pins or bolts. The disadvantage of this type of fabrication is that separate tools and fastening means must be provided for securing the housing sections together. Moreover, for housings of different sizes, correspondingly different molding devices must be provided, thus contributing substantially to the overall cost of providing a variety of differently-sized housings.

It is an object of this invention, therefore, to provide a modular spin filter of the type described, which comprises a plurality of standard sections that are releasably attachable to each other in modular form to produce filter housings of substantially any desired size.

Another object of this invention is to provide improved means for securing together the housing sections of spin filters of the type described, so that the housings can be assembled without the use of any separate fastening means or tools.

Other objects of the invention will be apparent hereinafter from the specification and from the recital of the appended claims, particularly when read in conjunction with the accompanying drawings.

SUMMARY OF THE INVENTION

A typical spin filter made according to this invention comprises a generally rectangular, plastic housing having front and rear sections, respectively, which are secured together by two end walls, one of which is solid, and the other of which has therein a pair of discharge openings disposed to be connected by a bleeder duct to a dust bin, or the like. The front section of the housing has fixed therein a plurality of spaced, parallel tubes in the outer end of each of which is secured a conventional spinner element or core, which is disposed to face in the direction of the incoming gas which is to be filtered. The rear section of the housing has projecting from its inside face a plurality of rigid discharge tubes or ducts which extend coaxially into the rear ends of the filter tubes that project from the front section of the housing. Incoming air or gas is swirled as it passes the spinner element in each filter tube so that heavy particles in the gas are thrown or otherwise urged radially outwardly so as to pass in the usual manner to the bleeder duct through an annular space which is formed between the confronting ends of each filter tube and associated discharge tube. Also in the usual manner, the dust-free gas is then discharged from the housing through the centers of the discharge tubes in the rear section.

A principal novel feature of this invention is that the front and rear sections of each housing have confronting flanges which engage each other with tongue and groove connections to prevent relative movement between the two sections in a vertical plane. Moreover, the two end walls of each housing are releasably secured to opposite ends of the front and rear sections, respectively, by cooperating dovetail-type connecting means, which are formed on the confronting surfaces of the endwalls and housing sections adjacent the four corners of the housing. The advantage is the front and rear housing sections can be made in standard sizes, and then one or more pairs thereof can be releasably attached end-to-end in a modular manner to produce a housing of any desired length. With such housing, one of the two end panels is solid to seal the associated end of the housing, while the other end panel has therein one or more openings for connection by a bleeder duct to a dust bin, or the like.

THE DRAWINGS

DETAILED DESCRIPTION OF THE PREFERRED EMBODIMENTS OF THE INVENTION

Figure 1:
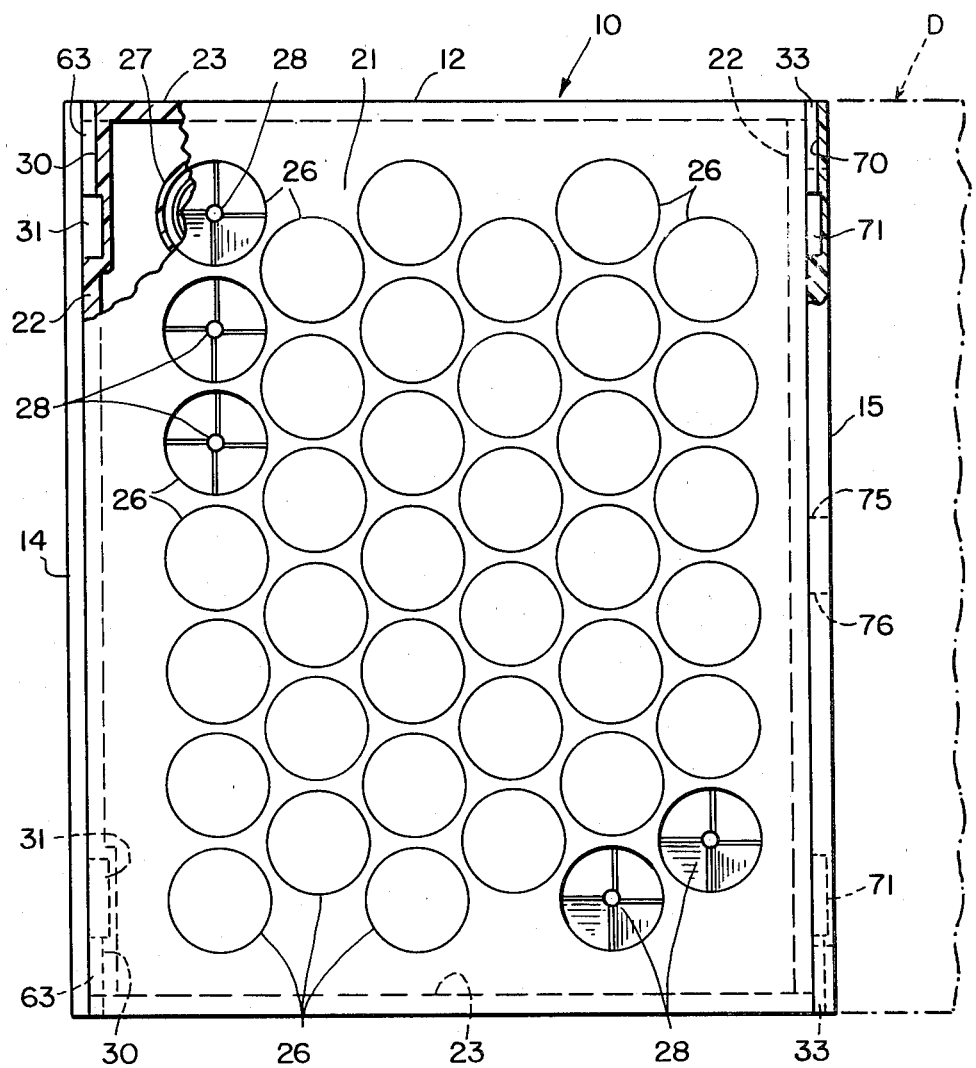
FIG. 1 is a front elevational view of a modular filter element made according to one embodiment of this invention, portions of the element being cut away and shown in section, and showing in phantom by broken lines a bleeder duct, which is attached to one end of the housing.

Referring now to the drawings by numerals of reference, and first to FIGS. 1 to 3, 10 denotes generally a modular filter element comprising a rectangular enclosure having front and rear sections 12 and 13, respectively, which are releasably secured together by a pair of rectangular end walls or panels 14 and 15. Each of the four different sections 12, 13, 14 and 15 of the housing 10 may be molded from a metal or from a plastic material, such as for example a polypropylene.

The front section 12 comprises a plane, rigid, rectangular wall 21 having a pair of integral side flanges 22, which project at right angles rearwardly from the wall along opposite sides thereof. A second pair of integral flanges 23 project at right angles rearwardly from the upper and lower edges, respectively, of wall 21, and at right angles to the side flanges 22. Moreover, as shown more clearly in FIGS. 2 and 3, the top and bottom flanges 23 extend substantially greater distances rearwardly from wall 21 than do the side flanges 22. Also, each flange 23 has projecting centrally from its edge remote from wall 21 a longitudinally extending tongue section 24, which is slightly thinner than the associated flange 23, and which is used for innerconnecting the front and rear sections 12 and 13 as noted hereinafter.

The rear section 13 of the module also comprises a plane, rectangular wall 41, which like the above-described front section 12 has a pair of integral, rearwardly projecting side flanges 42, and a pair of top and bottom flanges 43, which project rearwardly from panel 41 at right angles to the side flanges and equi-distantly beyond the two side flanges 42. Moreover, flanges 43 have in their outer edges shallow, longitudinally extending grooves 44, which are rectangular in configuration and, which are shaped to accommodate the projections 24 on the flanges 23 of the front section of the module, as shown in FIGS. 2 and 3.

Wall 21 of the front section 12 has therethrough a plurality of spaced, circular openings 26, each of which registers with one of a plurality of filter tubes 27, which are integral with and project at right angles rearwardly from wall 21 about spaced, parallel axes. Each filter tube 27 has mounted in its forward end (its left end as shown in FIG. 3) an integral spinner element or core 28 of conventional design. Wall 41 of the rear section 13 also has therein a plurality of spaced, circular openings 46, each of which registers with the bore in one of a plurality of integral, similarly-shaped discharge ducts or tubes 47, which project from the rear surface of wall 41 coaxially into the rear ends of the filter tubes 27. As shown in FIG. 3, the discharge ducts 47 are generally frusto-conical in configuration at the end portion thereof which are integral with the wall 41, while the opposite end portion 47' thereof are generally cylindrical in configuration and are smaller in diameter than the bores of the filter tubes 27, so that an annular space is formed between the adjacent ends of each pair of cooperating tubular means 27 and 47.

Referring now to the means for assemblying and holding the front and rear sections 12 and 13 in operative relation to each other, and first to section 12, one of its two side flanges 22 (the left hand flange as shown in FIG. 1) has in its outer surface, and at opposite ends thereof, respectively, two dovetail-shaped slots or grooves 30, each of which opens at its outer end on the exterior of section 12, and at its inner end on one of two, spaced, rectangular notches or reecesses 31, which are also formed in the outer surface of the same flange 22 inwardly of its dovetail grooves 30. The other side flange 22 of section 12 (the right hand flange 22 as shown in FIG. 1) has projecting from its outer surface, and adjacent opposite ends thereof, respectively, a pair of spaced, dovetail-shaped tongues or projections 33, which project beyond the right end (FIG. 2) of section 12, and which are similar in configuration and size to the above-described dovetail-shaped grooves 30. Moreover, as shown in FIG. 1, the dovetail projections 33 are positioned in lateral, parallel registry with the corresponding dovetail grooves 30 that are located in the opposed side flange 22 for purposes noted hereinafter.

Figure 2:
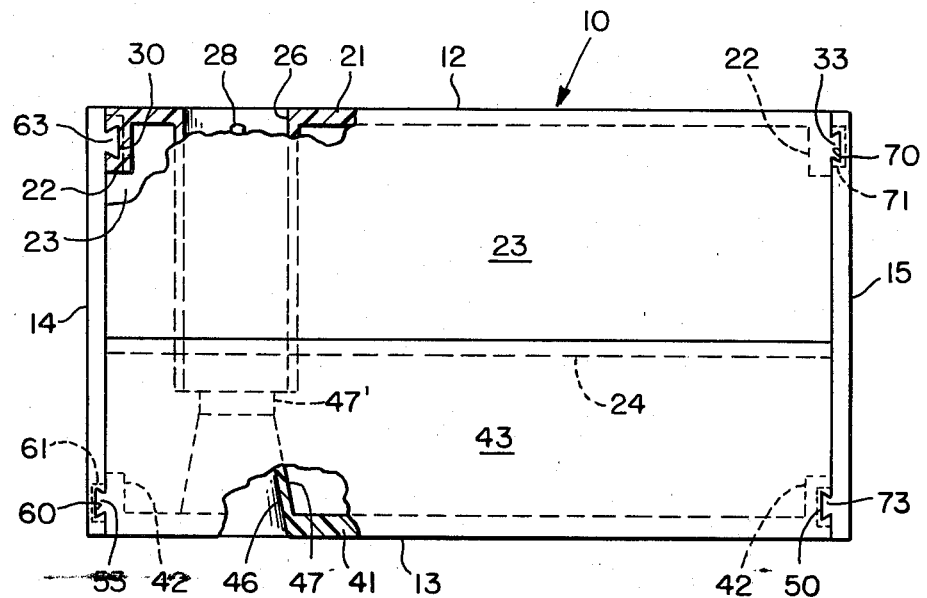
FIG. 2 is a bottom plan view of this modular filter element, again with portions of the element being broken away and shown in section.
Figure 3:
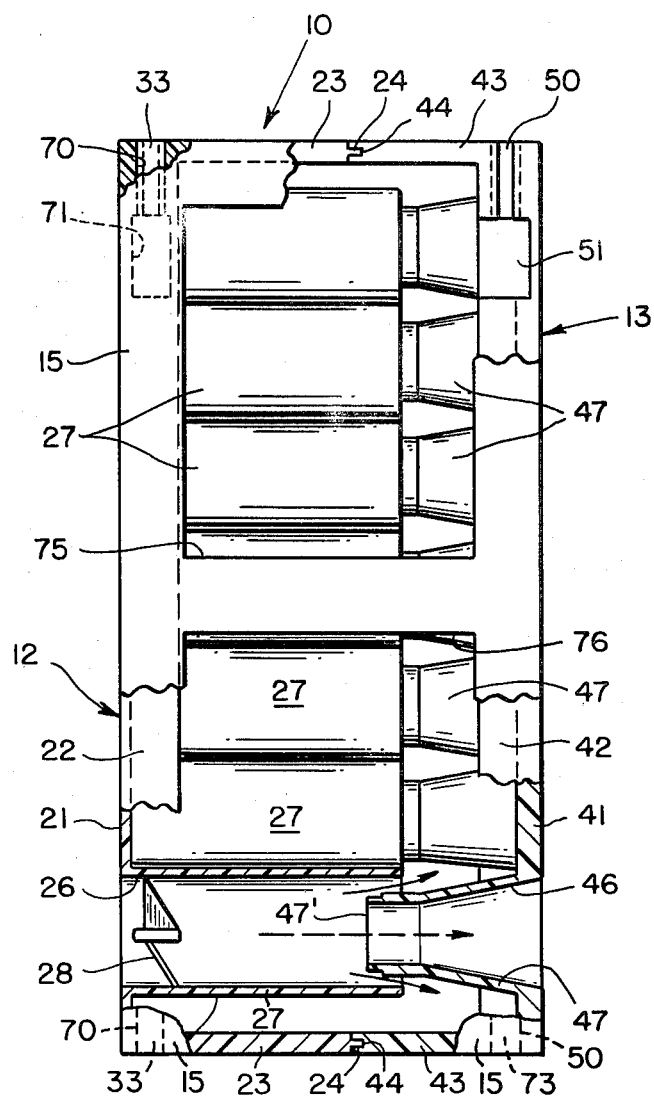
FIG. 3 is a side elevational view of this element looking toward the right end thereof as shown in FIG. 1, again with portions of the housing being broken away and shown in section.

One of the side flanges 42 on the rear section 13 (the right hand side flange 42 as shown in FIG. 2) also has in its outer surface adjacent opposite ends thereof a pair of spaced, dovetail-shaped slots or grooves 50 (FIGS. 2 and 3), each of which opens at its outer end on the exterior of section 13, and at its inner end on an enlarged, rectangularly shaped groove or notch 51, which is generally similar in configuration to the notches 31 formed in the front section 12. The opposite side flange 42 of section 13 has projecting from its outer surface adjacent opposite ends thereof a pair of spaced, integral, dovetail-shaped tongues or projections 53, only one of which is illustrated in FIG. 2. However, it will be appareciated that the two projections 53, which project beyond the left end (FIG. 2) of section 13, are positioned in such manner as to register laterally with, and to extend parallel to, the corresponding grooves 50 formed in the outer surface of the opposite or opposed side flange 42.

The left hand end cap or panel 14 as shown in FIGS. 1 and 2 comprises a solid, rectangularly shaped wall, which has in its inside surface adjacent one side edge thereof a pair of spaced, dovetail-shaped grooves 60, each of which opens at one end on the outer surface of the cap 14, and at its inner end on one of two, spaced, rectangularly-shaped notches or recesses 61, which are formed in the inner surface of the cap 14 inwardly of grooves 60. Adjacent its opposite end cap 14 has projecting from its inside surface a pair of aligned, dovetail-shaped tongues or projections 63, which extend parallel to and are disposed to register laterally with the grooves 60 in the cap. Moreover, when the module 10 is assembled as shown in the drawings, the projections 53 at one end of the rear section 13 seat snugly in the correspondingly shaped grooves 60 in the end cap 14, while the projections 63 on this end cap likewise fit snugly in the registering dovetail grooves 30 in the front section 12.

Similarly, the other end cap 15 has in its inside surface along one side edge thereof a pair of aligned, dovetail-shaped grooves 70, which are located at opposite ends of the cap to open on outer ends at their exterior of the cap, and at their inner ends on one of a pair of enlarged, rectangularly-shaped notches or recesses 71, which are formed in cap 15 inwardly of the grooves 70. Adjacent its opposite side edge cap 15 has projecting from its inside surface a pair of spaced, dovetail-shaped projections 73, which are aligned laterally with the grooves 70. When the module 10 is assembled the tongues 33 on the front section 12 seat in the correspondingly shaped grooves 70 in the end cap 15, while the tongues 73 on this end cap likewise seat slidably in the dovetail groove 50 in section 13. In this manner the dovetail couplings or connections at each of the four corners of the module 10 operate to secure its four sections in their assembled, operative positions.

As shown more clearly in FIG. 3, the end cap or panel 15 has therethrough two, large, rectangularly-shaped openings 75, which are adapted to be connected to one end of a conventional bleeder duct D (broken lines in FIG. 1). This duct operates to create a vacuum in housing 10 around the outsides of the cooperating pairs of filter tubes 27 and discharge tubes 47 for a purpose noted hereinafter.

In use, the module 10 is designed to be positioned to have gas enter the left ends of the filter tubes 27 as shown in FIG. 3, so that the spinner elements 28 cause the gas to swirl in the tubes as it passes from the left toward the right to the discharge end of each tube. The dust and moisture droplets in the swirling gases are urged radially outwardly by centrigugal forces in each filter tube 27, finally to pass through the annular spaces between tubes 27 and 47, and in the directions indicated by the arrows shown in solid lines in FIG. 3, to the bleeder duct D (FIG. 1). This duct can be attached in any known manner to the end cap 15 in communication with its discharge openings 75 and 76, and is adapted to bleed off a portion of the gas entering the module 10, and with it the particles of dust or moisture which are forced radially outwardly in each of the filter tubes 27 by virtue of the associated spinner element 28. The remaining gas passing through each filter tube 27 enters centrally into the associated discharge duct 47 as indicated by the arrow shown by broken lines in FIG. 3, and is discharged out of the rear or right hand end of the module 10.

In order to disassemble module 10, one need only to shift the end cap 14, for example, downwardly in FIG. 1 relative to sections 12 and 13 so that the upper tongue 63 will be shifted downwardly into notch 31 in section 12, while the lower tongue 63 will be shifted downwardly to the exterior of section 12. This downward movement of cap 14 also causes the upper groove 60 in the cap to slide downwardly and out of engagement with the upper tongue 53 on the rear section 13, and at the same time causes the lower groove 60 and the associated notch 61 to shift downwardly relative to the lower tongue 53 on section 13, so that this last-named tongue now registers with the lower rectangular recess 61 in cap 14, thus permitting the cap to be withdrawn laterally from engagement with the sections 12 and 13.

Similarly, the opposite ends of the two sections 12 and 13 can be released by shifting cap 15 downwardly in FIG. 1 relative to the two sections 12 and 13 to cause the upper detent or tongue 33 to be disengaged from the upper groove 70 in cap 15, and to cause the recess 71 in the lower end of cap 15 to be shifted into registry with the lower projection 33. At the same time the projections 73 adjacent the opposite side of cap 15 will be shifted downwardly to disengage the lower projection 73 from the lower groove 50 in section 13, and to place the upper projection 53 in registry with the upper recess 71 in the cap, so that cap 15 can now be withdrawn from engagement with sections 12 and 13. Sections 12 and 13 can then be separated from one another.

From the foregoing it will be apparent that the present invention provides relatively simple and inexpensive means for releasably attaching together the four sections which comprise a single module 10. By using the dovetail connections it is possible to eliminate the need for any special tools and fastening means for securing the various sections of a module together. One need only to place the front and rear sections 12 and 13 of a module into engagement with each other, and then to insert the end caps 14 and 15 into locking engagement with the sections 12 and 13 by shifting the end caps vertically (as shown in FIG. 1) relative to the two sections. When using the large, rectangular openings or notches at the inner ends of each of the dovetail-shaped grooves, it is possible to connect or disconnect the front and rear sections simply by shifting the end caps in either one direction or the other selectively to engage or disengage their dovetail coupling means.

Figure 4:
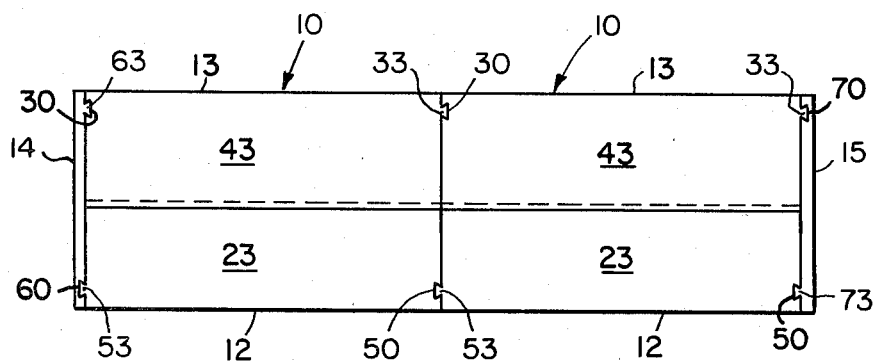
FIG. 4 is a bottom plan view of a modular filter made from two of these filter elements, which are releasably attached end-to-end to each other.

FIG. 4 illustrates how two or more of the modules can be releasably attached to each other to produce a spin filter element or housing of any desired length. In this embodiment the module 10 shown at the left side of the figure has attached to its right end, instead of an end cap 15, a second module 10 by virtue of insertion of the projections 33 on the left hand module 10 into the grooves 30 on the left end of the next successive module 10, at the same time that the projections 53 on the second module are positioned slidably in the cooperating grooves 50 in the first-named module. Otherwise the assembly is the same. Moreover, it will be apparent that any number of modules 10 can be attached end-to-end in this manner; and moreover the modules could be stacked one on top of the other, row upon row.

From the foregoing it will be apparent that the present invention provides a modular spin filter element which is relatively inexpensive to manufacture and assemble, and which has the versatility of being able to be connected in tandem one with another to form a spin filter element of almost any desired size.

While it has been suggested that the sections of each element be releasably connected by dovetail-shaped connecting means, it will be readily apparent to one skilled in the art that other shapes could be employed, if desired. Also, while this invention has been illustrated and described in detail in connection with only certain embodiments thereof, it will be apparent that it is capable of still further modification, and that this application is intended to cover any such modifications as may fall within the scope of one skilled in the art, and the appended claims.

Having thus described my invention, what I claim is:

1. A spin filter module, comprising
   a pair of front and rear sections, respectively, releasably engaged with each other to form a rectangular enclosure open at opposite ends thereof,
   spaced tubular means extending transversely through said enclosure to convey gas from openings in said front section to discharge openings in said rear section and including means for causing particles in said gas to be centrifugally separated from the gas and discharged into said enclosure,
   a pair of rectangular end panels, and means releasably connecting said end panels to opposite ends of said sections at said opposite ends, respectively, of said rectangular enclosure, whereby said front and rear sections are releasably secured together by said end panels,
   one of said panels being solid thereby to seal said enclosure at one end thereof, and the other of said panels having therethrough an opening for connecting the interior of said enclosure with a bleeder duct for conveying away the particles discharged into said enclosure.

2. A spin filter module as defined in claim 1, wherein said connecting means comprises projections on said panels slidably engaged in registering grooves in said front and rear sections releasably to secure said panels to said sections.

3. A spin filter module as defined in claim 1, wherein said connecting means comprises projections on said sections slidably engaged in registering grooves in said end panels releasably to secure said panels to said sections.

4. A spin filter module as defined in claim 1, wherein said connecting means comprises a plurality of dovetail-shaped projections formed on one of two confronting surfaces on said panels and sections, respectively, and slidably and releasably engaged in registering dovetail-shaped grooves formed in the other of said confronting surfaces.

5. A spin filter module as defined in claim 4, wherein
four of said projections are located at each end of said enclosure, and each of said four projections is located adjacent one of the four corners of said enclosure, whereby
said end panels are shiftable manually in planes parallel to their own planes, and in one direction relative to said front and rear sections to engage said projections in locking positions in said grooves, and in the opposite direction to remove the projections from said locking positions.

6. A spin filter module as defined in claim 5, wherein certain of said projections are on said front and rear sections, and others of the projections are on said end panels.

7. A spin filter as defined in claim 6, wherein
each of said sections has a pair of said projections extending beyond one end thereof, and a pair of said grooves in the opposite end thereof, and in spaced registry with said pair of projections thereon, and
each section is releasably attachable at said one end thereof to said other end of another, similar section, whereby a plurality of like sections can be releasably attached to each other between said end panels.

8. A modular spin filter comprising
a pair of front and rear sections positioned in operative engagement with each other,
a pair of end panels releasably secured to opposite ends of said front and rear sections to secure said sections releasably in their operative positions, and
means for conveying a gas, which is to be filtered, from gas inlet openings in one of said sections to gas discharge openings in the other of said sections, including means for centrifugally removing particles from the gas as it passes between said sections,
each of said end panels being releasably connected to said sections by tongue and groove connecting means permitting each panel to be manually shifted relative to said sections in one direction to connect the panel to said sections and in the opposite direction to disconnect the panel from said sections.

9. A modular spin filter as defined in claim 8, wherein said tongue and groove connecting means comprises a plurality of projections on one of said opposite ends of each of said sections, and a like plurality of grooves in the other opposite end of each section in registry with, and similar in configuration to, said projections, said projections on said one opposite end of a section being releasably insertable into the grooves on said other opposite end of another of said sections whereby a plurality of like sections can be connected end to end by said connecting means.

10. A modular spin filter as defined in claim 9, wherein said projections are dovetail-shaped and extend parallel to each other.

* * * * *